(12) United States Patent
Honda (10) Patent No.: US 9,459,818 B2
(45) Date of Patent: Oct. 4, 2016

(54) IMAGE FORMING APPARATUS WITH RECOVERY PRINTING FUNCTION THAT ALLOWS USER TO DESIGNATE RECOVERY PRINTING STARTING PAGE

(71) Applicant: Oki Data Corporation, Tokyo (JP)

(72) Inventor: Akihiro Honda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/722,625

(22) Filed: May 27, 2015

(65) Prior Publication Data

US 2015/0347060 A1 Dec. 3, 2015

(30) Foreign Application Priority Data

May 29, 2014 (JP) ................................ 2014-111329

(51) Int. Cl.
*G06F 3/12* (2006.01)
(52) U.S. Cl.
CPC ............. *G06F 3/121* (2013.01); *G06F 3/1204* (2013.01); *G06F 3/1234* (2013.01)
(58) Field of Classification Search
CPC ....................................................... G06F 3/121
USPC ...................................... 358/1.14, 1.13, 1.15
See application file for complete search history.

(56) References Cited

U.S. PATENT DOCUMENTS

| 2003/0095279 | A1* | 5/2003 | Kim ........................ G06F 3/121 358/1.14 |
| 2010/0245899 | A1* | 9/2010 | Hirama .................... G06F 3/121 358/1.15 |
| 2011/0002699 | A1* | 1/2011 | Aoki ..................... G03G 15/238 399/17 |
| 2011/0179961 | A1* | 7/2011 | Yanagawa ............. G06F 3/1208 101/483 |
| 2014/0240738 | A1* | 8/2014 | Kadiyala .............. G06K 15/408 358/1.13 |

FOREIGN PATENT DOCUMENTS

| JP | H03-218868 A | 9/1991 |
| JP | 2005-335256 A | 12/2005 |

* cited by examiner

*Primary Examiner* — Jacky X Zheng
(74) *Attorney, Agent, or Firm* — Muncy, Geissler, Olds & Lowe, P.C.

(57) ABSTRACT

An image forming apparatus includes a print processing part that executes print processing of print data on a continuous print medium; an operation part to which an instruction is input and that displays information; a storage part that stores page IDs for identifying pages of the print data and characteristic image data of the pages; and a control part that controls recovery printing after a restoration from a print processing error. When the control part executes the recovery printing, the operation part displays the page IDs of pages in a selectable manner and the characteristic image data of the page which corresponds to at least one of the page IDs, when one of the page IDs is selected, the recovery printing is initiated from the page that is designated by the selected page ID.

10 Claims, 8 Drawing Sheets

| Page Count (N) | Page ID (Pid) | Print Data Storage Position (Pdt) | Characteristic Difference Image (Pim) |
|---|---|---|---|
| 1 | ID001 | DAdr1 | Img1 |
| 2 | ID002 | DAdr2 | Img2 |
| 3 | ID003 | DAdr3 | Img3 |
| 4 | ID004 | DAdr4 | Img4 |
| 5 | ID005 | DAdr5 | Img5 |
| ... | ... | ... | ... |

IMAGE FORMING APPARATUS WITH RECOVERY PRINTING FUNCTION THAT ALLOWS USER TO DESIGNATE RECOVERY PRINTING STARTING PAGE

CROSS REFERENCE

The present application is related to, claims priority from and incorporates by reference Japanese Patent Application No. 2014-111329, filed on May 29, 2014.

TECHNICAL FIELD

The present invention relates to an image forming apparatus.

BACKGROUND

Conventionally, in a printer for performing printing on a continuous long medium such as a rolled paper reeled out from a rotatable roll on which a pint paper such as a tape, a ribbon, etc., is wound on a page-by-page basis, when an error such as a jam occurred, at the time of resuming printing after recovery of the error, it is configured to perform recovery printing for performing reprinting of the page where printing could not be adequately performed due to the error In the recovery printing, considering that the error might also have affected pages succeeding the page where the error occurred, a technique has been proposed in which reprinting is performed from a page preceding the page where the error occurred by predetermined pages by accessing a buffer that stores print data on a page-by-page basis (see, for example, Patent Document 1).

Further, there is also proposed a technique in which, when reprinting is performed from a page preceding the page where an error occurred by predetermined pages, a pattern serving as a mark is initially printed so that a user of the printer can readily confirm that the reprinting was initiated from which page, and then reprinting is performed (see, for example, Patent Document 2).

PRIOR ART DOCUMENT

[Patent Document 1] Japanese Unexamined Patent Application Publication No. H3-218868
[Patent Document 2] Japanese Unexamined Patent Application Publication No. 2005-335256

In the conventional printer, however, even in cases where it is recognized that a long medium is being normally carried prior to a detection of an occurrence of an error such as a jam, etc., there is a case in which a damage such as a wrinkle, etc., has already occurred as a predictor of an error. The printing performed on such a damaged portion cannot be used as normal printing. For this reason, in the recovery printing, even if reprinting is performed from a page preceding the page where an error occurred by a predetermined pages, in cases where a portion corresponding to a page further preceding by the predetermined pages got a damage, there is a problem that all of the pages requiring reprinting cannot be covered.

In such a case, it is required that a user operates a host device of the printer to specify a reprinting initiation page and again transmits the print data to the printer, resulting in an extremely troublesome task.

The present invention has been made to solve the conventional problems, and aims to provide an image forming apparatus capable of storing a page ID for identifying a page of print data and characteristic image data of the page, when performing recovery printing after a restoration from an error, easily selecting a recovery printing initiation page, and performing recovery printing of required pages in just proportion based on a print result recognized by a user at the time of an occurrence of an error without requiring retransmission of print data from a host device by displaying characteristic image data of a recovery printing page when a page ID of the recovery printing initiation page is selected.

SUMMARY

An image forming apparatus disclosed in the application includes a print processing part that executes print processing of print data on a continuous print medium; an operation part to which an instruction is input and that displays information; a storage part that stores page IDs for identifying pages of the print data and characteristic image data of the pages; and a control part that controls recovery printing after a restoration from a print processing error. When the control part executes the recovery printing, the operation part displays the page IDs of pages in a selectable manner and the characteristic image data of the page which corresponds to at least one of the page IDs, when one of the page IDs is selected, the recovery printing is initiated from the page that is designated by the selected page ID.

According to the present invention, an image forming apparatus stores a page ID for identifying a page of print data and characteristic image data of the page, and displays the characteristic image data of the page when the page ID of a recovery printing initiation page is selected at the time of performing the recovery printing after restoration from an error. With this, without retransmitting the print data from a host device, based on a print result confirmed by a user at the time of an occurrence of an error, a recovery printing initiation page can be easily selected, and recovery printing of required pages can be performed in just proportion.

DETAILED DESCRIPTION OF EMBODIMENTS

Hereinafter, an embodiment of the present invention will be detailed with reference to the drawings.

Figure 1:
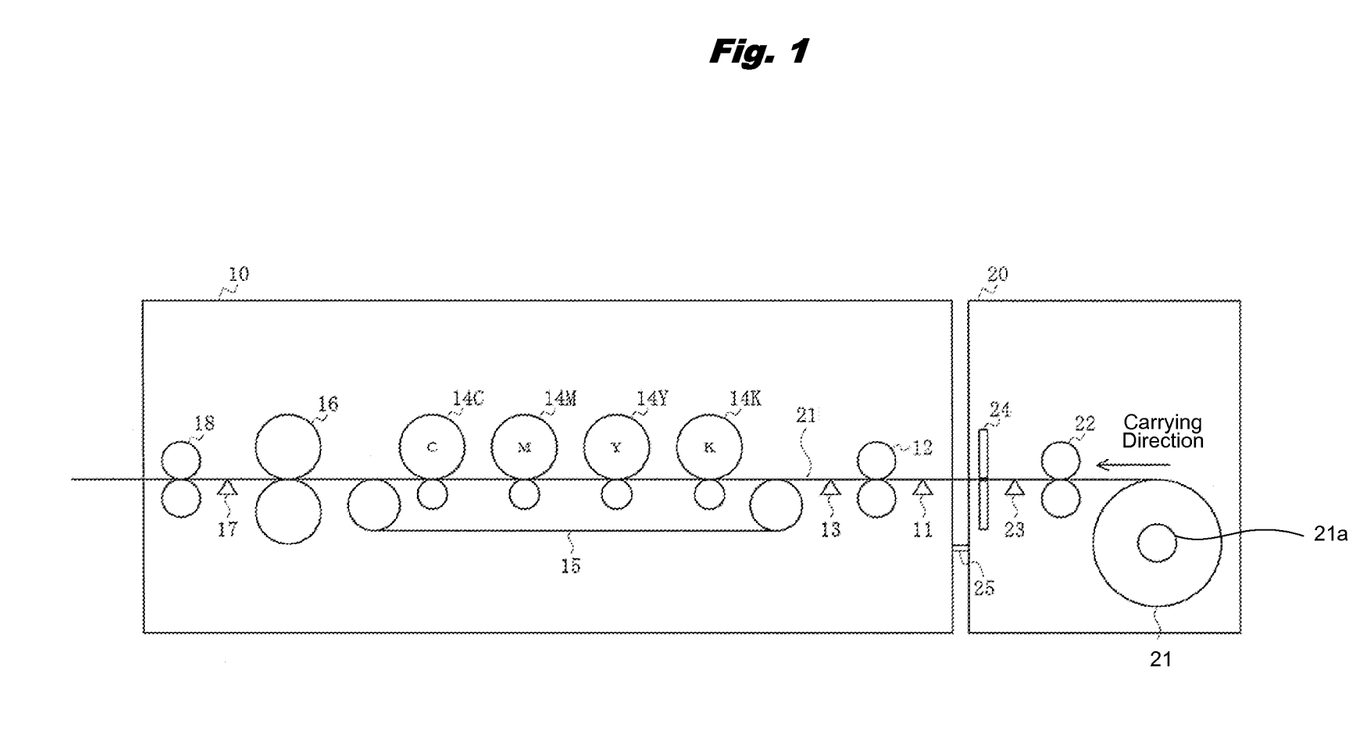
FIG. 1 illustrates a schematic structural view of an image forming apparatus according to an embodiment of the present invention.
Figure 2:
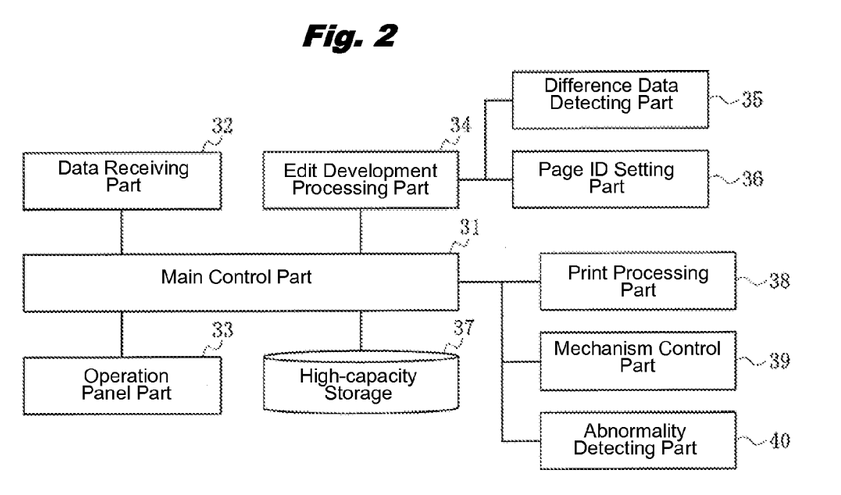
FIG. 2 is a block diagram showing a functional structural of the image forming apparatus according to the embodiment of the present invention.
Figure 3:
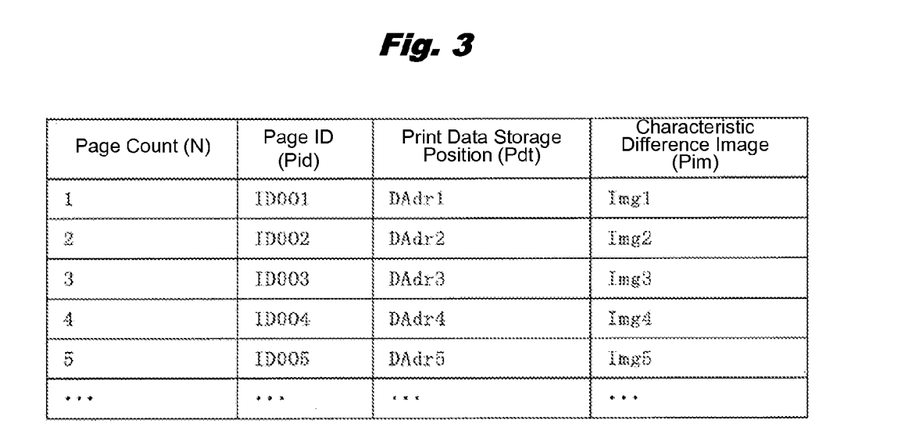
FIG. 3 is a structural view showing print data after edit development according to the embodiment of the present invention.

FIG. 1 is a schematic structural view of an image forming apparatus according to an embodiment of the present invention. FIG. 2 is a block diagram showing a functional structure of the image forming apparatus according to the embodiment of the present invention. FIG. 3 is a structural view showing print data after edit development according to the embodiment of the present invention.

In the drawings, the reference numeral "10" denotes an image forming apparatus as a printer according to this embodiment. The image forming apparatus can be any kinds of print devices as long as it is a print device capable of performing printing on a band-shaped long continuous print medium 21 as a medium utilizing any kinds of image forming systems such as an inkjet system, an impact dot system, an electrophotographic system, a thermal transfer system, etc. Further, the image forming apparatus can be a monochrome print device or a color print device. In this embodiment, the explanation will be directed to the case in which the image forming apparatus 10 is a color print device of an electrophotographic system. The image forming apparatus 10 receives a print instruction from a host device such as a personal computer, etc., which is not illustrated, to perform printing on a print medium 21.

Further, the reference numeral "20" denotes a medium carrying mechanism part, which is a mechanism part for supplying a long print medium 21 such as a rolled paper to the image forming apparatus 10, and a device independently arranged outside the image forming apparatus 10 and connected to the image forming apparatus 10 by a connecting part 25.

The image forming apparatus 10 includes a sheet feeding detection part 11, a medium carrying part 12, a medium leading edge write detection part 13, a transfer belt 15, a fuser part 16, an ejection detection part 17, a medium ejection part 18, arranged along the carrying direction of the print medium 21, and four image forming parts 14K, 14Y, 14M, and 14C corresponding to each color of black (K), yellow (Y), magenta (M), and cyan (C).

Figure 7:
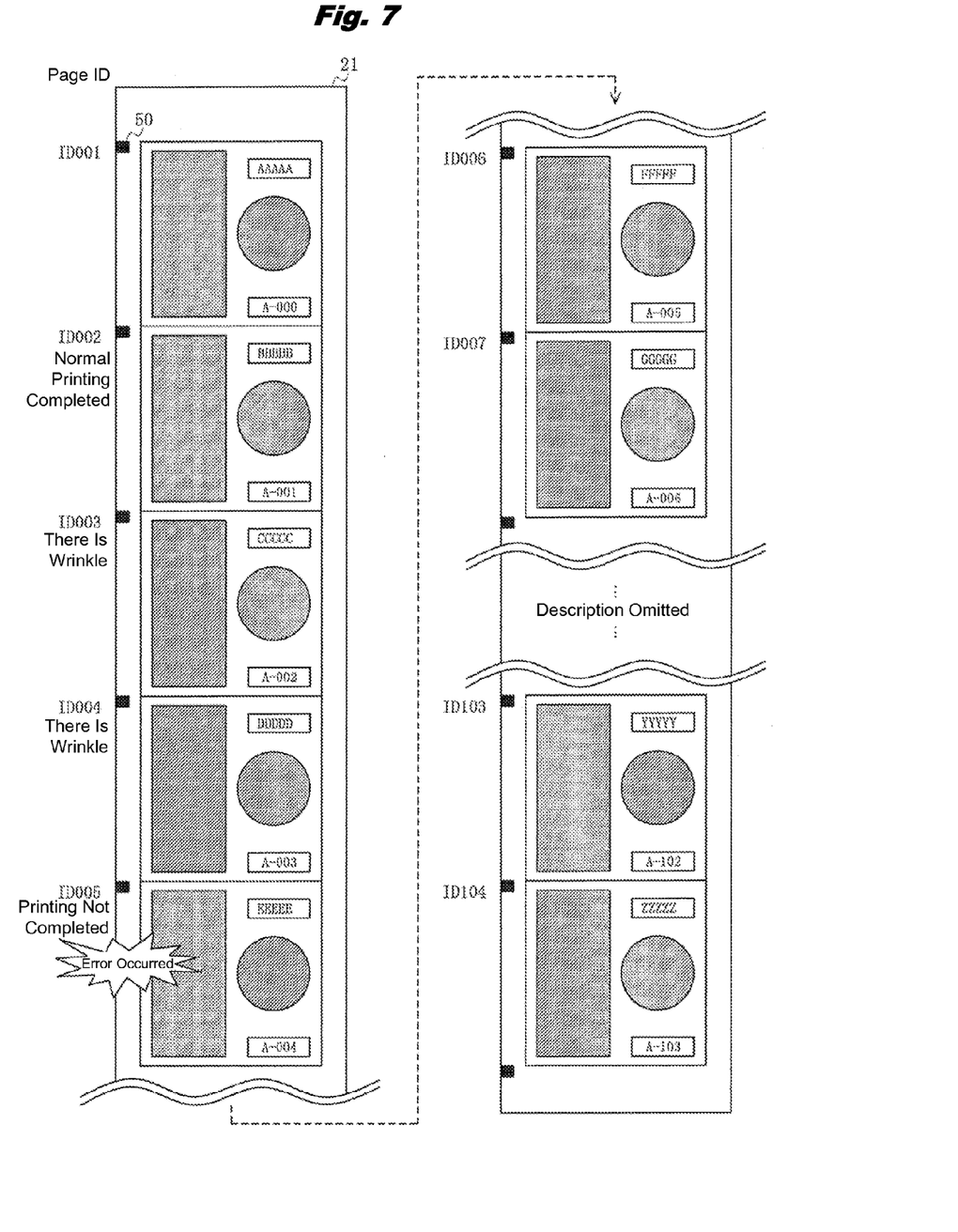
FIG. 7 is a view explaining an operation at the time of an occurrence of an error according to the embodiment of the present invention.

The sheet feeding detection part 11 and the ejection detection part 17 are, for example, mechanical sensors for detecting an existence or non-existence of the print medium 21 by a switch, but also include a means capable of detecting carrying abnormalities of the print medium 21, such as, e.g., an optical sensor equipped with a function of detecting a black mark 50 of the print medium 21 as shown in FIG. 7, which will be described, and a rotation detection sensor for detecting the carrying of the print medium 21.

Further, the medium carrying mechanism part 20 includes a medium carrying part 22 for carrying a long continuous print medium 21 to the image forming apparatus 10, a medium position detecting part 23 for detecting the black mark 50 previously printed on the print medium 21, and a cutter 24 for cutting the print medium 21.

The cutter 24 is equipped with a movable blade driven by a drive source which is not illustrated and extending in a width direction of the print medium 21. The cutter 24 cuts the print medium 21 with a predetermined length by driving the movable blade.

The connecting part 25 transmits a mark detection signal from the medium carrying mechanism part 20 to the image forming apparatus 10, and receives a cut executive instruction, etc., from the image forming apparatus 10.

The print medium 21 is, as shown in FIG. 1, prepared in a state of a roll in which the print medium 21 is preliminary wound around a core 21a and mounted in the medium carrying mechanism part 20 so as to be rotated centering around the core 21a. The print medium 21 is wound off from the roll by being carried by the medium carrying part 22.

The print medium 21 is fed from the medium carrying mechanism part 20 at a predetermined timing. And, in the image forming apparatus 10, the toner image formed by the image forming parts 14K, 14Y, 14M and 14C is transferred on the surface of the print medium 21 while being carried along the carrying path. When the print medium 21 is fed to the fuser part 16, a fusing process is performed by the fuser roller and the pressure application roller of the fuser part 16, so that the toner image melt by being heated and pressured at a high temperature is fused to the print medium 21. Subsequently, the print medium 21 in which the toner image was fused is ejected from the inside of the image forming apparatus 10 by the medium ejection part 18.

Further, the image forming apparatus 10 is equipped with a computing means such as a CPU, a MPU, etc., a storage means such as a magnetic disc, a semiconductor memory, etc., and a communication interface, etc., and further equipped with a control device, which is not illustrated, for controlling the operation of each part.

From the functional viewpoint, as shown in FIG. 2, the control device includes a main control part 31 as a control part for controlling recovery printing after restoration from an error, a data receiving part 32, an operation panel part 33 as an operation part that is capable of inputting an instruction by a user and displaying information, an edit development processing part 34 as an edit development processing part for editing and developing print data into image data, a difference data detecting part 35, a page ID setting part 36, a high-capacity storage 37 as a storage part for storing page IDs for identifying a page of print data and characteristic image data of a page, a print processing part 38 as a print processing part for executing print processing of print data on a continuous print medium 21, a mechanism control part 39, and an abnormality detecting part 40.

The main control part 31 is a control part for controlling the operation of the entire image forming apparatus 10. The data receiving part 32 executes a communication control for receiving print data transmitted from a host device, which is not illustrated, via a communication line such as a USB (Universal Serial Bus) line, a wireless LAN (Local Area Network), etc.

Further, the operation panel part 33 is an operation part for, e.g., performing various kinds of operations such as a menu setting change, etc., by a user or displaying the status of the image forming apparatus 10, and is equipped with a display means such as a CRT, an LCD (Liquid Crystal Display) panel, an LED (Light Emitting Diode) panel, etc., an input means such as a keyboard, a touch sensor, etc., or a voice output means such as a speaker, etc.

Further, the edit development processing part 34 edits and develops the print data received from a host device into image data and creates data for recovery printing as shown in FIG. 3. Further, the page ID setting part 36 sets a page ID (Pid) for identifying each page of the developed print data. Further, the difference data detecting part 35 determines whether characteristic difference data of the page is included from the preceding and succeeding pages and creates the data as a characteristic difference image (Pim) when data that meets conditions is detected.

The edited and developed print data is stored in the high-capacity storage 37. Further, the print data storage position (Pdt), the page ID, and the difference data are associated with each other and stored in the high-capacity storage 37. The high-capacity storage 37 stores various settings of the image forming apparatus 10 and exerts the function of storing temporary storing print data, etc.

Further, the print processing part 38 forms the edited and developed print data, for example, on the photosensitive drum of the image forming parts 14K, 14Y, 14M, and 14C, and executes print processing. Concretely, the print processing of the print data is executed on a page-by-page basis. Further, the mechanism control part 39 controls a motor, which is not illustrated, etc., for carrying the print medium 21 to control the carrying of the print medium 21. Further, the mechanism control part 39 controls the operation of the cutter 24 to activate a movable blade 24. Further, the abnormality detecting part 40 performs a detection using a sensor, and gives notice of the error state to the mechanism control part 39 and the main control part 31 when an abnormality occurred during the carrying of the print medium 21.

Next, the operation of the image forming apparatus 10 having the aforementioned structure will be explained. Initially, the operation of the edit development processing will be explained.

Figure 4:
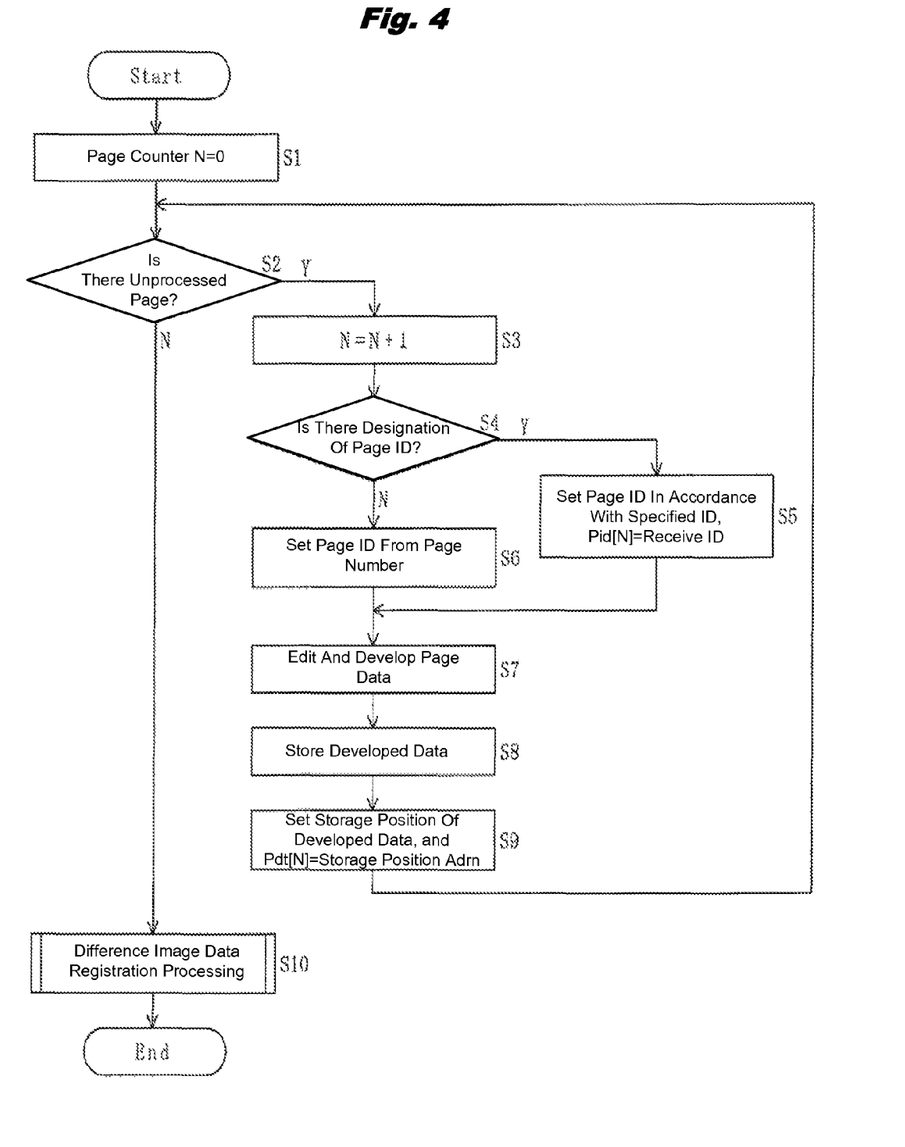
FIG. 4 is a flowchart showing an operation of edit development processing according to the embodiment of the present invention.

FIG. 4 is a flowchart showing an operation of edit development processing according to an embodiment of the present invention.

The print data transmitted from a host device is received by the data receiving part 32 and temporality stored in the high-capacity storage 37. The image forming apparatus 10 initiates the edit development processing of the print data.

When the edit development processing is initiated, initially, in Step S1, the edit development processing part 34 initializes a page counter, i.e., N=0.

Subsequently, in Step S2, the edit development processing part 34 determines whether there is page data in which the edit processing has not been processed, i.e., whether there is an unprocessed page. When there is an unprocessed page, the edit development processing part 34 increments the page counter value, i.e., N=N+1.

Subsequently, in Step S4, the edit development processing part 34 determines whether information of a page ID designated by a host device is added to the page data, i.e., whether there is a designation of a page ID. When there is the designation of page ID, i.e., there is information on page ID, in Step S5, the page ID setting part 36 stores the designated page ID as a page ID (Pid) of the page. That is, in accordance with the designated ID, a page ID is set so that Pid[N]=receive ID. For example, in the print data, when the information on the page ID is designated as A-000, A-001..., Pid is set to A-000, A-001....

Further, judging whether there is a designation of a page ID, when there is no designation of a page ID, the page ID setting part 36 sets a predetermined page ID from a page number counted by the image forming apparatus 10 in Step S6. For example, ID001, ID002... are set.

Subsequently, in Step S7, the edit development processing part 34 executes the edit development of the page data. Then, in Step S8, the edit development processing part 34 stores the result of the edit development in the high-capacity storage 37. That is, a development data storing is performed.

Subsequently, in Step S9, the edit development processing part 34 stores the storage position of the stored page data as the information (Pdt) at the time of recovery printing. That is, the storage position of the developed data is set so that Pdt[N]=Storage position AdrN. Then, the edit development processing part 34 returns to Step S2 to repeat the determination on whether there is an unprocessed page.

Judging whether there is an unprocessed page, when there is no unprocessed page, the difference data detecting part 35 executes difference image data registration processing in Step S10, and the image forming apparatus 10 terminates the edit development processing.

Next, the flowchart will be explained.

Step S1: The edit development processing part 34 sets the page counter to N=0. Step S2: The edit development processing part 34 determines whether there is an unprocessed page. When there is an unprocessed page, the process proceeds to Step S3, and when there is no unprocessed page, the process proceeds to Step S10.

Step S3: The edit development processing part 34 sets the page counter to N=N+1. Step S4: The edit development processing part 34 determines whether there is a designation of a page ID. When there is a designation of a page ID, the process proceeds to Step S5, and when there is no designation of a page ID, the process proceeds to Step S6.

Step S5: The page ID setting part 36 sets a page ID in accordance with the designated ID so that Pid[N]=receive ID.

Step S6: The page ID setting part 36 sets a predetermined page ID from the page number which is being counted by the image forming apparatus 10.

Step S7: The edit development processing part 34 executes the edit development of the page data.

Step S8: The edit development processing part 34 stores the developed data.

Step S9: The edit development processing part 34 sets the storage position of the developed data so that Pdt[N]= Storage position AdrN, and the process returns to Step S2.

Step S10: The difference data detecting part 35 executes the difference image data registration processing, and terminates the edit development processing.

Figure 6:
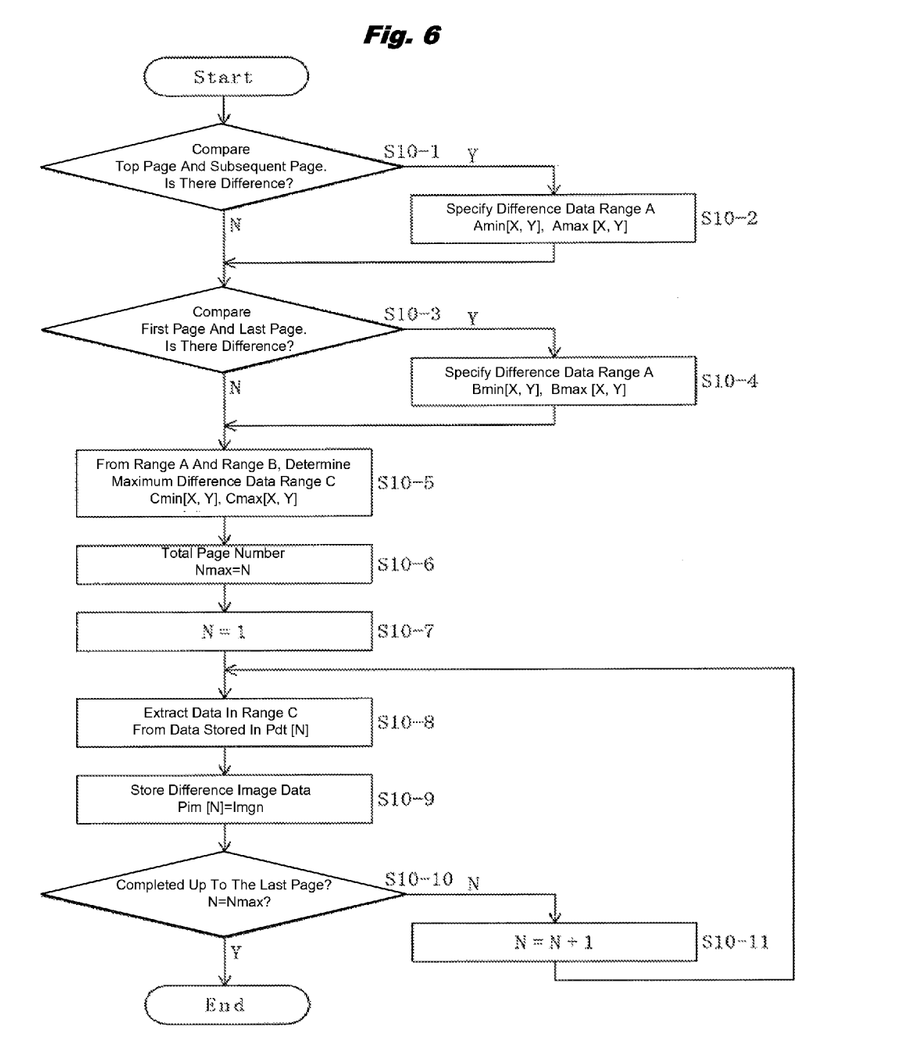
FIG. 6 is a flowchart showing a subroutine of the difference image data registration processing according to the embodiment of the present invention.

Next, the subroutine of the difference image data registration processing will be explained.

Figure 5:
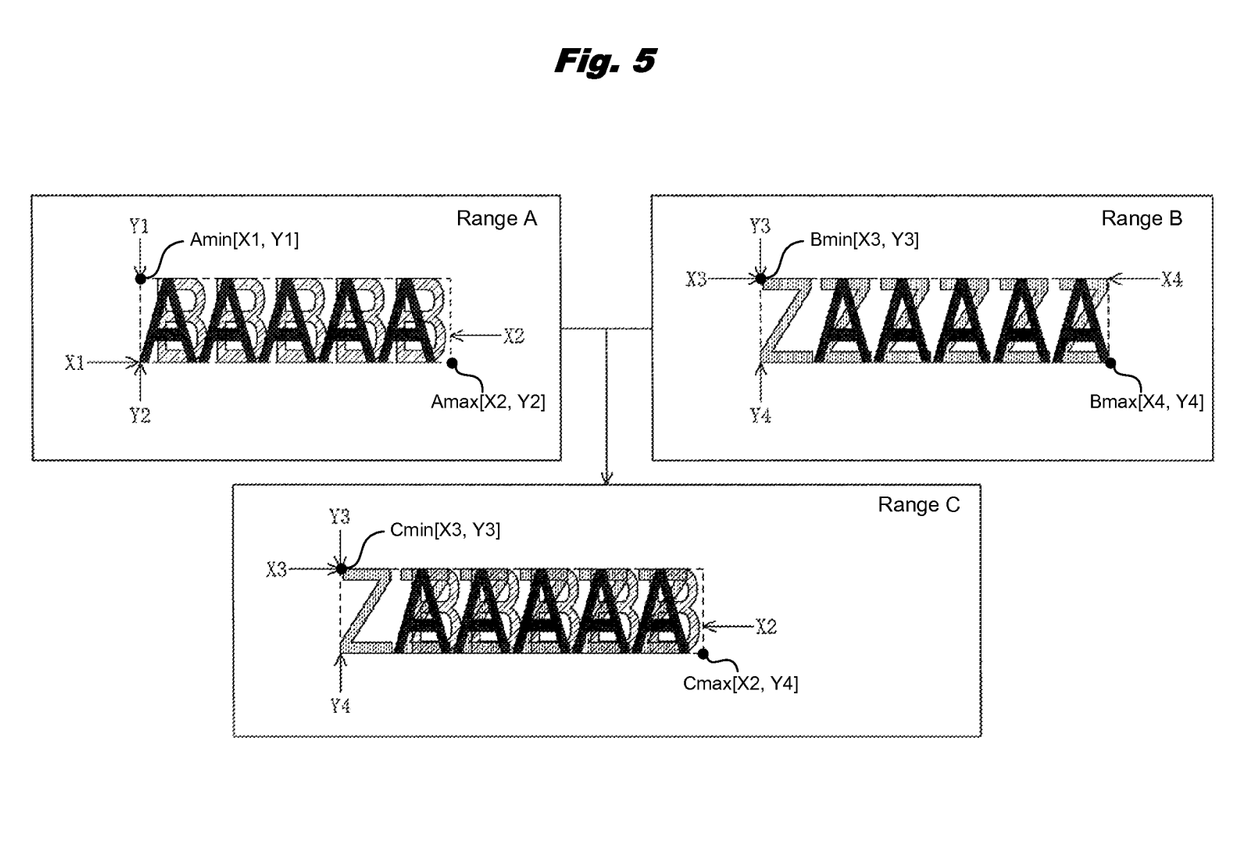
FIG. 5 is a view explaining an extraction example of difference image according to the embodiment of the present invention.

FIG. 5 is a drawing explaining an extraction sample of difference image according to an embodiment of the present invention. FIG. 6 is a flowchart showing a subroutine of the difference image data registration processing according to this embodiment of the present invention.

When the difference image data registration processing is initiated, in Step S10-1, the difference data detecting part 35 initially compares data of the first page and data of the subsequent page to determine whether there is a difference between the data. When there is a difference between the data, in Step S10-2, the difference data detecting part 35, as shown in FIG. 5, specifies the coordinate (Amin [X1, Y1], Amax [X2, Y2] showing the range A of the difference in the horizontal direction and the vertical direction. That is, the difference data range A is specified and set to Amin [x, y] and Amax [x, y].

Subsequently, in Step S10-3, the difference data detecting part 35 compares data of the first page and data of the last page to determine whether there is a difference between the data. When there is a difference between the data, in Step S10-4, the difference data detecting part 35, as shown in FIG. 5, specifies the coordinate (Bmin [X3, Y3], Bmax [X4, Y4] showing the range B of the difference in the horizontal direction and the vertical direction. That is, the difference data range B is specified and set to Bmin [x, y] and Bmax [x, y].

Subsequently, in Step S10-5, the difference data detecting part 35, as shown in FIG. 5, respectively specifies the coordinate (Cmin [X3, Y3], Cmax [X2, Y4]) of the range C which is the maximum range with respect to the vertical direction and the horizontal direction from the range A and the range B. That is, the maximum difference data range C is determined from the ranges A and B and set to Cmin [x, y] and Cmax [x, y]. More specifically, the invention is expected to be mainly applied to image data including variable data, such as serial numbers. In order to obtain the difference data (featured region=the region of the variable data) from the print page, a location where the variable data, which becomes difference data, is present is first determined from the difference data between the first and second pages. Next, by comparing the difference data with the final page with respect to the determined location, maximum region in which variation as the print region of the variable data is likely to occur is predicted and obtained.

Subsequently, in Step S10-6, the difference data detecting part 35 copies the value of the page counter N to the total page counter Nmax. That is, it is set to the total page number Nmax=N.

Subsequently, in Step S10-7, the difference data detecting part 35 initializes the page counter N to 1, i.e., N=1.

Subsequently, in Step S10-8, the difference data detecting part 35 extracts the difference image from the image data corresponding to the page counter N and the range C. That is, from the data stored in Pid [N], the data of the range C is extracted. The difference image is created, for example, from page data which were bit-map developed by applying a cutting process, which is one of common cutting processes, to a region that is designated with the coordinate that is, for example, region C above.

Subsequently, in Step S10-9, the difference data detecting part 35 stores the extracted image data in Pim [N]. That is, the difference image data is stored and it is set to Pim [N]=ImgN.

Subsequently, in Step S10-10, the difference data detecting part 35 determines whether the registration has been completed up to the data of the last page. That is, it is determined whether N=Nmax. When the registration has been completed up to the data of the last page, the difference data detecting part 35 terminates the difference image data registration processing.

Further, when the registration has not been completed up to the data of the last page, in Step S10-11, the difference data detecting part 35 increments the counter, i.e., N=N+1. Then, the difference data detecting part 35 returns to Step S10-8, and repeatedly performs the extraction of the difference image from the data Pim [N] of each page.

Here, an example of the difference image data registration processing is explained. However, the difference image can be registered by preliminary receiving the range C of the difference position as coordinate data and trimming the data of the range by the print data. Alternatively, the difference image can be registered by receiving dedicated image data from a host device as difference image data and registering as difference image data. Further, as to the timing for executing the registration of the difference image, the registration can be performed before executing the edit development, and data before development are compared to specify the range of the difference.

Next, a flowchart will be explained.

Step S10-1: The data of the top page and the data of the subsequent page are compared, and it is determined whether there is a difference between the data. When there is a difference between the data, the process proceeds to Step S10-2, and when there is no difference between the data, the process proceeds to Step S10-3. When there is no difference, difference date indicating the difference region zero is created.

Step S10-2: Specifying of the difference data range A is performed and set to Amin [x, y] and Amax [x, y].

Step S10-3: The data of the top page and the data of the last page are compared, and it is determined whether there is a difference between the data. When there is a difference between the data, the process proceeds to Step S10-4, and when there is no difference between the data, the process proceeds to Step S10-5.

Step S10-4: Specifying of the difference data range B is performed and set to Bmin [x, y] and Bmax [x, y].

Step S10-5: The maximum difference data range C is determined from the ranges A and B and set to Cmin [x, y] and Cmax [x, y].

Step S10-6: The value of the page counter N is set to a total page number Nmax=N. Step S10-7: The page counter N is set to N=1.

Step S10-8: The data of the range C is extracted from the data stored in Pid [N].

Step S10-9: The difference image data is stored to set to Pim [N]=ImgN.

Step S10-10: It is determined whether the registration has been completed up to the data of the last page. That is, it is determined whether N=Nmax. When the registration has been completed up to the data of the last page, the difference image data registration processing is terminated. When the registration has not been completed up to the data of the last page, the process proceeds to Step S10-11.

Step S10-11: The page counter is set to N=N+1, and the process returns to Step S10-8.

Figure 9:
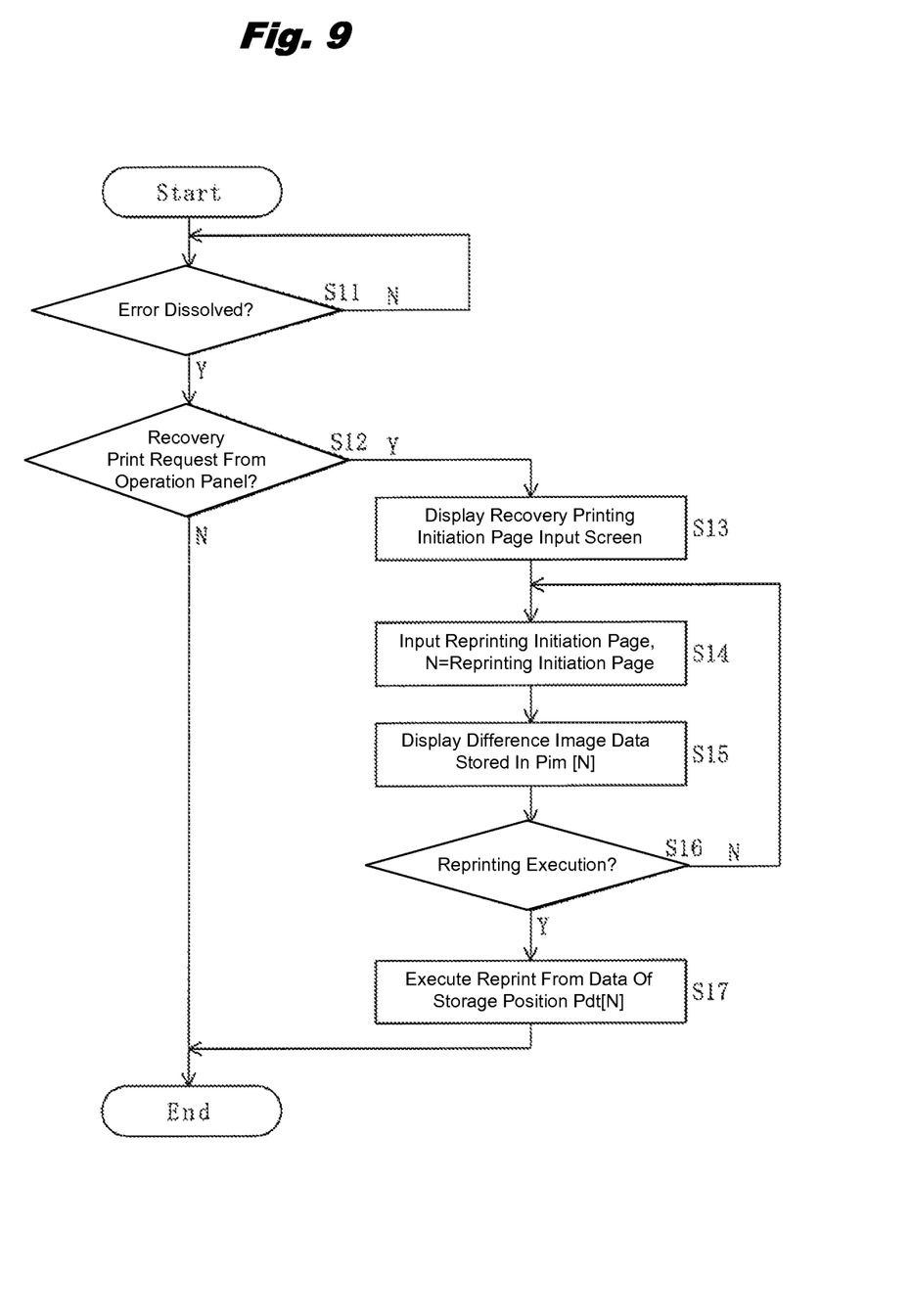
FIG. 9 is a flowchart showing an operation of recovery printing control processing at the time of an error recovery according to the embodiment of the present invention.

Next, the operation of the recovery printing control processing at the time of error restoration will be explained.

Figure 8:
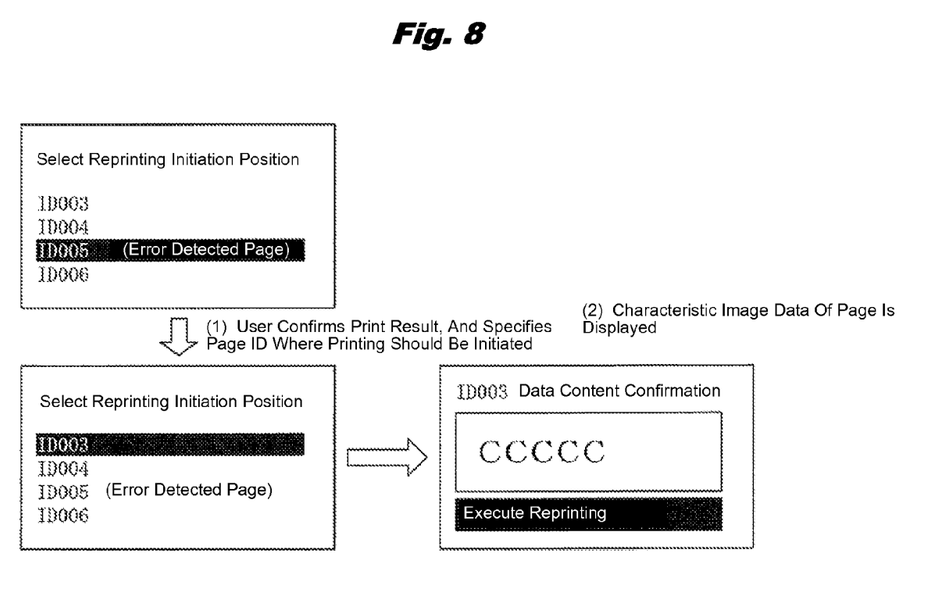
FIG. 8 is a view explaining an operation of an operation panel part at the time of an an occurrence of an error according to the embodiment of the present invention.

FIG. 7 is a view for explaining an operation at the time of an error occurrence according to an embodiment of the present invention. FIG. 8 is a view for explaining an operation of an operation panel part at the time of an error occurrence according to the embodiment of the present invention. FIG. 9 is a flowchart showing an operation of recovery printing control processing at the time of an error recovery according to the embodiment of the present invention.

When recovery printing control processing at the time of an error restoration is initiated, in Step S11, the main control part 31 determines whether the error has been dissolved after the error occurrence and restored from the error state. That is, it is determined whether the error has been dissolved. Here, when the error has not been dissolved, in Step S11, the main control part 31 repeats the judgment on whether the error has been dissolved.

When the error has been dissolved, in Step S12, the main control part 31 determines whether a user has requested reprinting. That is, it is determined whether there is a recovery printing request from the operation panel part 33. When there is no recovery printing request from the operation panel part 33, the main control part 31 terminates the recovery printing control processing at the time of the error restoration.

Further, when there is a recovery printing request from the operation panel part 33, i.e., there is a reprinting request, in Step S13, the main control part 31 makes the operation panel part 33 display the input screen of the recovery printing initiation page. That is, the main control part 31 makes the operation panel part 33 perform a recovery printing initiation page input screen display. In this case, the operation panel part 33 displays the page where the error was detected as a reference position (default selection position). For example, as shown in FIG. 7, when an error occurs during the printing of N=5, in the operation panel part 33, as shown in FIG. 8, preceding and succeeding page IDs are displayed as a reference position of "ID005" registered as the corresponding page ID (Pid).

Subsequently, the user confirms the printed medium, i.e., the print result of the print medium 21 on which printing was performed, and, in Step S14, inputs the page determined that recovery printing is required by operating the operation panel part 33. That is, as an N=printing initiation page, the initiation page of the recovery printing is selected. In Step S15, the main control part 31 makes the operation panel part 33 display the difference image data stored with respect to the selected page. That is, the main control part 31 makes the operation panel part 33 display the difference image data stored in Pim [N].

Subsequently, a user confirms the difference image data displayed on the operation panel part 33, and in Step S16, determines whether reprinting should be executed. For example, as shown in FIG. 7, when a damage such as a wrinkle, etc., is generated before an occurrence of an error, the user confirms a print result, and determines that it is necessary to resume printing from the print data including "CCCCC" in the print content. Further, as shown in FIG. 8, the user selects the recovery printing initiation page by operating the operation panel part 33 and confirms that the contents of the recovery printing initiation print data is a page including the data of "CCCC."

Like the case in which it is determined that it is not appropriate as a recovery printing initiation page, the user determines not to execute the reprinting. When the recovery printing execution is not instructed, returning to Step S14, the user again inputs the recovery printing initiation page as an N=reprinting initiation page.

Further, when the user determines to execute the reprinting and instructed to execute the recovery printing in the selected print initiation page, in Step S17, the main control part 31 executes the reprinting from the data of the print data storage position Pdt [N] of the selected page, and the recovery printing control processing at the time of the error restoration is terminated.

When printing of all pages was normally completed, the data of the stored page ID (Pid), the print data storage position (Pdt) and the characteristic difference image (Pim) are deleted from the high-capacity storage 37.

Next, the flowchart will be explained.

Step S11: The main control part 31 determines whether the error has been dissolved. When the error has been dissolved, the process proceeds to Step S12, and when the error has not been dissolved, the judgment on whether the error has been dissolved is repeated.

Step S12: The main control part 31 determines whether there is a recovery printing request from the operation panel part 33. When there is a recovery printing request from the operation panel part 33, the process proceeds to Step S13. When there is no recovery printing request from the operation panel part 33, the recovery printing control processing at the time of error restoration is terminated.

Step S13: The main control part 31 causes recovery printing initiation page input screen display.

Step S14: The user inputs the page determined that recovery printing is required by operating the operation panel part 33 as an N=reprinting initiation page.

Step S15: The main control part 31 causes the difference image data stored in the Pim [N] display.

Step S16: the user determines whether reprinting should be executed. When executing reprinting, the process proceeds to Step S17, and when not executing reprinting, the process returns to Step S14.

Step S17: The main control part 31 executes reprinting from the data of the print data storage position Pdt [N] of the selected page, and terminates the recovery printing control processing at the time of the error restoration.

As explained above, in this embodiment, the page ID corresponding to the page and the characteristic difference image data of the page are stored. Therefore, when executing the recovery printing after restoration of the error, the user can confirm the content of the recovery printing initiation page intended by the user, and the recovery printing can be initiated by specifying the recovery printing initiation page. This eliminates retransmission of the print data from the host device, the time and effort for executing the edit development processing of the retransmitted print data. Further, since the recovery printing is initiated from the start page intended by the user, the print medium 21 can be executed without wastefully using the print medium 21.

In this embodiment, although only the example in which the image forming apparatus 10 is a printer for a color electrophotographic system is explained, as long as the image forming apparatus is an apparatus capable of printing onto a long print medium 21 operating as a concept of a page, any type of image forming apparatus can be applied.

Further, the present invention is not limited to the aforementioned embodiment, and is capable of being variously changed based on the gists of the present invention, which are not intended to exclude from the scope of the present invention.

What is claimed is:

1. An image forming apparatus comprising:
a print processing part that executes print processing of print data on a continuous print medium;
an operation part to which an instruction is input and that displays information;
a storage part that stores page IDs for identifying pages of the print data and characteristic image data of the pages;
a control part that controls recovery printing after a restoration from a print processing error, and
a difference data detecting part that creates difference data for each page based on preceding and succeeding pages of the each page, wherein
when the control part executes the recovery printing, the operation part displays a page ID of the page at which the print processing error was detected as a default selection position and a plurality of page IDs of pages that precede the page at which the print processing error was detected in a selectable manner and the characteristic image data of the page which corresponds to at least one of the page IDs,
when one of the page IDs is selected, the recovery printing is initiated from the page that is designated by the selected page ID and resumes the execution of print processing of remaining print data, and
the difference data includes the characteristic image data of the each page.

2. The image forming apparatus according to claim 1, wherein
the print processing part executes the print processing of the print data on the print medium based on a page-by-page basis.

3. The image forming apparatus according to claim 1, further comprising
an edit development processing part that edits and develops the print data into image data that is divided page by page, wherein
the edit development processing part
creates data for the recovery printing including the page IDs, a print data storage position and the characteristic image data of the page, and
stores those data in the storage part.

4. The image forming apparatus according to claim 3, wherein
the page ID, the print data storage position and the characteristic image data of the page are associated with each other and stored in the storage part.

5. The image forming apparatus according to claim 1, wherein
the characteristic image data of the page is difference image data.

6. The image forming apparatus according to claim 1, wherein
when the control part executes the recovery printing, the operation part also displays page IDs of succeeding pages of the page at which the print processing error was detected in the selectable manner.

7. The image forming apparatus according to claim 1, further comprising:
a page counter that counts a number of the pages printed, wherein
the operation part displays the page IDs when the print data contains the page IDs and displays page numbers for the pages based on the number of pages counted by the page counter as the page IDs when the print data does not contain the page IDs.

8. The image forming apparatus according to claim 1, wherein
the continuous print medium is a long, continuous medium on which the print data for a plurality of pages is printable.

9. The image forming apparatus according to claim 8, wherein
the continuous print medium includes page marks that indicate respective ones of the printed pages.

10. The image forming apparatus according to claim 1, wherein
the control part causes the operation part to display the characteristic image data of the page designated by the page ID selected by the operation part.

* * * * *